United States Patent [19]
Olmstead

[11] Patent Number: 5,657,342
[45] Date of Patent: Aug. 12, 1997

[54] ADAPTIVE DATA RATE PACKET COMMUNICATION SYSTEM

[76] Inventor: David Olmstead, 6 Dogwood Ct., Village of Pine Run, Blackwood, N.J. 08012-4305

[21] Appl. No.: 242,008

[22] Filed: May 12, 1994

Related U.S. Application Data

[60] Continuation-in-part of Ser. No. 112,321, Aug. 27, 1993, Pat. No. 5,335,247, which is a division of Ser. No. 965,700, Oct. 23, 1992, Pat. No. 5,274,667.

[51] Int. Cl.⁶ .......................... H04B 1/69; H04B 1/707; H04J 13/02
[52] U.S. Cl. .......................... 375/200; 375/206
[58] Field of Search .......................... 375/200, 205, 375/206, 204, 201; 370/18

[56] References Cited

U.S. PATENT DOCUMENTS

| | | |
|---|---|---|
| 3,754,211 | 8/1973 | Rocher et al. . |
| 4,270,205 | 5/1981 | DeShon . |
| 4,393,501 | 7/1983 | Kellogg et al. . |
| 4,672,605 | 6/1987 | Hustig et al. ............... 375/200 |
| 4,694,467 | 9/1987 | Mui .......................... 375/200 |
| 4,803,685 | 2/1989 | Oget . |
| 4,905,234 | 2/1990 | Childress et al. . |
| 4,914,699 | 4/1990 | Dunn et al. ................ 375/206 |
| 5,241,563 | 8/1993 | Paik et al. .................. 370/18 |
| 5,410,568 | 4/1995 | Schilling ................... 375/206 |

FOREIGN PATENT DOCUMENTS

| | | |
|---|---|---|
| 55-73157 | 2/1980 | Japan . |
| 2179827 | 3/1987 | United Kingdom . |

OTHER PUBLICATIONS

David Chase, *Code Combining—A Maximum-Likelihood Decoding Approach for Combining an Arbitrary Number of Noisy Packets*, May 1985, pp. 385–393, IEEE Transactions On Communications, vol. Com-33.

Mark Hewish, *GPS Comes of Age*, Defense Electronics & Computing (Supplement to International Defense Review), Jul. 1991, pp. 75, 77, 79, 81–82 and 84.

*Primary Examiner*—Wellington Chin
*Assistant Examiner*—Jean B. Corrielus
*Attorney, Agent, or Firm*—Richard C. Litman

[57] ABSTRACT

An adaptive data rate communications system makes a compound error communications channel, with random and non-random impulsive noise, appear to be a gaussian channel. The process uses a cascade of digital error control coding, spread spectrum modulation, pseudo random chip interleaving, and feedback techniques. The communications process yields a dynamic chip to bit ratio for each frame. These communications process techniques along with the careful employment of the time/distance factors of distance between transmitter and receiver, chip transmission rate, nominal chip to bit ratio, and number of bits in the frame, yield a high throughput efficiency.

2 Claims, 12 Drawing Sheets

ADAPTIVE DATA RATE PACKET COMMUNICATION SYSTEM

CROSS-REFERENCE TO RELATED APPLICATIONS

This is a continuation-in-part of application Ser. No. 08/112,321, filed Aug. 27, 1993, now U.S. Pat. No. 5,335,247 which is a division of application Ser. No. 07/965,700 filed Oct. 23, 1992 now U.S. Pat. No. 5,274,667

BACKGROUND OF THE INVENTION

1. Field of the Invention

The present invention relates to packet communications systems which transmit data along a communications channel (from station "A" to station "B"). A feedback path is provided on which station "B" will inform station "A" when a "valid" packet of data is received. The "validity" of a received packet will be determined at station "B" by means of a digital error control coding (for example the Cyclic Redundancy Check code CRC-16 or CRC-CCITT, the popular 16 -bit codes used in the United States and Europe respectively). The advantage of the present invention resides in the way digital error control coding, spread-spectrum modulation, interleaving, and feedback techniques are utilized such that for the existing in situ channel conditions a minimum amount of energy is used to transmit each packet of information by automatically compensating for changes in the conditions of the channel.

2. Description of the Prior Art

In the prior art, data communications systems having feedback use an Automatic Repeat Request (ARQ) scheme. The three common variants are the Stop-and-Wait ARQ, the Go-Back-N Continuous ARQ, and the Selective-Repeat Continuous ARQ; variations of these three common variants also exist. All current feedback error control techniques suffer a common disadvantage in that they discard an entire frame of information if an error is detected.

U. S. Pat. No. 3,754,211 issued on Aug. 21, 1973 to Edward Y. Rocher et al discloses a data communications system by which blocks are retransmitted when no acknowledgment is received within a specified period of time.

Japanese patent number 55-73157 published Feb. 6, 1980 by Kazumasa Kumakura and UK. Pat. Application GB 2179827 A published Mar.11, 1987 by Takahashi et al disclose the use of an ACK signal to acknowledge the proper receipt of data while a No ACK signal is sent in response to error corrupted data being received.

U. S. Pat. No. 4,803,685 issued Feb. 7, 1989 to Christian Oget and U. S. Pat. No. 4,905,234 issued Feb. 27, 1990 to Jeffrey S. Childress disclose a process to specify which frames have not been received properly and retransmitting those frames.

U.S. Pat. No. 4,393,501 issued Jul. 12, 1983 to Richard A. Kellogg et al and U.S. Pat. No. 4,270,205 issued May 26, 1981 to Wallace E. DeShon disclose data communication systems with variable data rates.

The article by Mark Hewish et al (Defense Electronics & Computing Number 3[Editorial Supplement to International Defense Review, Jul. 1991]) discloses timing signals transmitted by the Global positioning System (GPS) usable with the present invention.

None of the above inventions and patents, taken either singly or in combination, is seen to describe the claimed present invention.

SUMMARY OF THE INVENTION

Definition of Terms and General Background

1. In non-spread spectrum digital communications systems the minimum "quantity" of information is equal to the transfer "unit"; both are referred to as a "bit".

2. In a spread spectrum digital communications system the minimum "quantity" of information is a "bit", but the transfer unit is one "chip", which has some average fractional relationship to a "bit". Therefore, a plurality of chips representing one bit is transmitted until a correct recognition acknowledgement (CRA) signal is received by the transmitter. The CRA is sent to the transmitter along a feedback path by the receiver after recognizing the bit represented by the plurality of chips received.

3. One can use the time associated with one chip from each bit of a packet to transmit information over the feedback channel. In this manner, the transmitter would only transmit one additional chip after the receiver has already recognized the bit represented by the plurality of chips before the transmitter would receive the CRA and start transmitting the first chip representing the next bit of the frame. For this situation the Throughput Efficiency in terms of energy utilization required for effective communications is equal to the Chip-To-Bit Ratio (CBR) divided by the quantity one plus the CBR.

Any random compound error channel (that is a channel that has a mixture of independent errors and burst errors present) can be transformed into an independent error channel, or what I call a stochastic communication channel, by using a digital spread-spectrum modulation and a pseudo random interleaving process. The result is the distribution of fractional portions of information throughout the transmission such that any random or periodic noise burst (with the exception of noise bursts that correlate with the pseudo random interleaving, or very intelligent jamming) will be distributed to as many bits of information as possible. A noise burst can have a duration as follows and will have the associated effect on communications effectiveness:

1. A duration of one chip or less. Very little effect on the transmission because of the high Chip-To-Bit ratio.

2. A duration of greater than on chip but less than one chip frame. Very little effect on the transmission because of the high Chip-To-Bit ratio. The interleaving has spread the effect of the burst out among the bits in the message and thereby prevented a concentrated effect on one bit.

3. A duration of greater than one chip frame but not beyond the power of the spread spectrum technique to overcome. Very little effect for the same reasons stated above.

4. A duration in excess of the effectiveness of the spread spectrum technique in use. The bit level error control coding technique will need to be used to identify the presence of errors. The effectiveness of the digital error control coding technique is enhanced because the noise environment appears stochastic rather than impulsive.

The present invention is a process that utilizes a variety of communications techniques in a particular method to provide a reliable digital packet communications apparatus. These techniques include digital error control coding, spread-spectrum modulation with interleaving, and feedback techniques. It is assumed that each packet will be of fixed size.

In the examples that follow I have used a frame size of 1400 bits, the chip to bit ratio to overcome thermal noise is assumed to be 10, the nominal chip to bit ratio for an average gaussian noise environment is 100, and the chip to bit ratio to indicate an abnormal system condition requiring operator action will be ten times the nominal chip to bit ratio or 1000.

The Transmission process

In broad terms the transmission process proceeds as follows:

1. A packet is obtained from a transmission buffer.

2. A digital error control code is appended to the packet to produce a frame.

3. The frame is modulated by a long binary pseudo random number (PRN) code (the spread spectrum modulation). In this step the length of the pRN is such that a significant number of chips in excess of what is expected to be required are produced for each bit. If the original system design indicates that a nominal chip to bit ratio of 100 is expected, a modulation process that yields 1000 chip for each bit would not be unreasonable.

4. The spread spectrum chips are interleaved to produce chip frames. This step results in groupings of chips such that if a frame has 1400 bits then the first chip frame would consist of 1400chips where the first chip from each of the 1400 bits would comprise the chip group.

5. The ordering of the chips in each chip frame is dependent on another PRN.

6. The transmitter starts sending the chip frames in sequence to the receiver station.

7. The transmitter station listens for a Correct Receipt Acknowledgment (CRA) form the receiver station on the feedback channel.

8. While the transmitter is sending one bit frame and listening for the CRA it prepares the next bit frame for transmission.

9. When the transmitter detects the CRA on the feedback channel it selects the first chip frame from the next bit frame for transmission at the conclusion of the current chip frame.

10. The transmitter repeats steps 7, 8, and 9 until all packets are transmitted.

The Reception process

In broad terms the reception process proceeds as follows:

1. The receiver establishes synchronization with the transmission station.

2. The receiver correlates the chip frames. This is the inverse of steps four and three of the transmission process above.

That is the chips are rearranged in a normal order from their pseudo random order, and the chips for each bit in the frame correlated for association to yield a bit determination.

3. After sufficient chips are associated for each bit a bit determination is made; the result is a bit frame. The determination of "sufficient" chips is based on many factors including the design minimum chip to bit ratio based on thermal noise, and evaluation of in situ conditions based on the preferred synchronization process.

4. The received bit frame from step three above is evaluated for validity based on the error control code that was appended in step two of the Transmission process. If the bit frame is validated the process continues to step five below; if not the process repeats step three above to obtain another chip frame.

5. Start sending the CRA to the transmission station on the feedback channel.

6. Evaluate the succeeding chip frames to detect the transition to the next bit frame. Once the bit frame transition is detected stop sending the CRA and go to step two above.

The Synchronization process

In the preferred embodiment this system will operate in a full duplex mode, that is information transmission in both directions at the same time. In this condition, both station A and station B will transmit the synchronization signal and acknowledgment information on the same channel. The receiver must know three things: first, exactly when each chip frame starts; second, exactly how long a chip frame lasts; and third, exactly when a first chip frame of any bit frame starts.

The transmitter station will continuously transmit a signal on the synchronization/feedback channel. This signal will always have a period equal to the duration of one chip frame and be constructed such that the start of each chip frame can be discerned.

Two basic signal constructions are required, with each having four possible alternate constructions (for a total of ten signal structures)

1. The first sequence will indicate the start of a bit frame and have a total duration of the bits per frame times the thermal noise chip to bit ratio (using the example numbers this would be 10times 1400 or 14000). This chip sequence would be so constructed that the exact start point of the sequence could be calculated from a sample as small as one chip frame (1400 chips).

2. The second sequence will indicate the chip frame timing of transmitted information and have the duration of one chip frame (1400 chips).

Each of the two sequences described above will have four alternate configurations to indicate one of four feedback conditions: correct receipt of a first frame, correct receipt of an even frame, correct receipt of an odd frame, and correct receipt of a last frame.

At any point in a transmission and reception process only one of the two transmission conditions can exist, and only one of the acknowledgment conditions can exist. Because of this historical. dependency reception, calculations need only be evaluated for the possible choices and the impossible choices can be ignored.

Accordingly, it is a principal object of the invention to make a communications channel appear only to have gaussian noise present even though random impulsive noise is present.

It is another object of the invention to make the communications channel appear only to have gaussian noise present even though non-random impulsive noise is present.

It is a further object of the invention to eliminate the need to totally discard transmitted frames of information when an error is detected in the frame.

It is a further object of the invention is to dynamically adjust the data rate through the channel to the in situ noise conditions.

Another object of the invention is to use measured data rates to automatically adjust transmitter power to keep the data rates within prescribed limits.

Yet still another object of the invention is to provide information to system operators on the historical characteristics of the communications channel, both of a short term duration (the chip to bit ratio required for a particular frame to be sent from one station to another) and of long duration (channel average chip to bit ratios that can be used to indicate such things as aging degradation of the system and predictions as to when corrective action will be required).

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
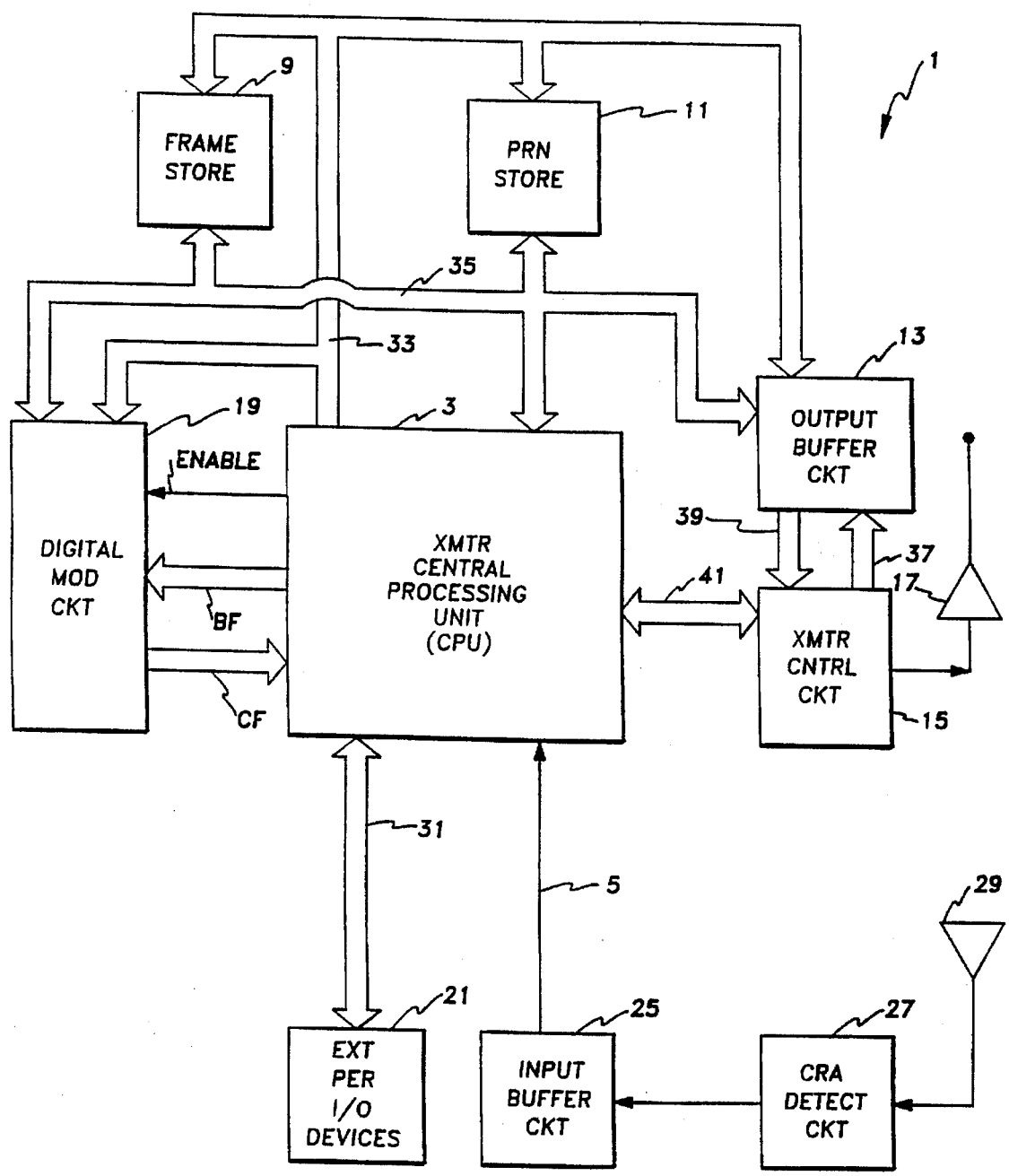
FIGS. 1A and 1B are block diagrams of the present invention.

The packet communications system for the first embodiment of the present invention utilizes a transmitter control system 1 to transmit data to a receiver. The transmitter control system 1 of the present invention is illustrated in FIG. 1A. The central processing unit (CPU) 3 is the main controller for the transmitter control system 1 and includes the necessary read only memory (ROM) random access memory (RAM) necessary, and clock signals for its operation.

An address bus 33 is used to allow the CPU 3 to access a specific portion of a particular circuit attached thereto. Part of the address bus 33 is used to specify the particular circuit; another part of the address bus 33 is used to access a specific portion of the particular circuit. The address bus also contains a write enable signal which allows the storage of information into the specific portion of the particular circuit from the data bus 35 when the write enable signal is asserted. When the write enable signal is not asserted, information from the specific area of the particular circuit addressed is transferred to the CPU 3 on the data bus 35. The transfer of data to and from storage circuitry as described above is well-known in the microprocessor art.

The frame store 9 is used to store the packets of information as frames of bits in the first embodiment. The pseudo-random number (PRN) store 11 is used to store the various pseudo-random numbers used in the first embodiment to modulate each frame of data to be transmitted. The digital modulation circuit 19 is used to modulate the bit frame or portion thereof provided to it by CPU 3 on the BF data line by the portion of a pRN provided to it by the CPU 3 on the data bus 35. Once the digital modulation circuit 19 is accessed by the address bus 35, and the ENABLE line is activated by the CPU 3, the data on the BF data line is modulated and the result thereof is produced on the CF data line representing the chip frame data for that portion of the bit frame just modulated. The bit frames are stored in the output buffer circuit 13 as they are modulated. The transmitter control circuit 15 accesses the output buffer 13 to retrieve data to be transmitted. The transmitter control circuit utilizes and address bus 37 to access storage locations within the output buffer 13 so as to retrieve data on the data bus 39. The address busses 37 and 35 are connected to circuitry within the output buffer 13 so that only one data bus can access the output buffer memory during any one portion of a clock cycle.

Transmitter control circuit 15 transmits the modulated bit frames along a data path of a communications channel via antenna 17. The antenna 29 is used to receive the CRA signal along a feedback path of the communications channel which is sent by the receiver. An input buffer circuit 25 is used to store each chip of the CRA as it is received from the CRA detection circuit 27. Data line 5 is connected to dedicated input ports of the CPU 3 so as to transmit the CRA chips stored in the input buffer circuit 25 when they are received by the input buffer circuit 25. Other dedicated ports include the BF data line, the CF data, the ENABLE line, and the data bus 41.

The Transmission process

The algorithm for the first embodiment of the present invention is described in detail in FIGS. 2A through 2E. Block 101 is the start of the transmission process which may be initiated in any conventional manner, e.g., pushing a transmit button. Block 102 is performed after the transmission process begins and until at least one packet has been stored within the frame store 9. In the first embodiment, the frame store 9 is provided with data from an external input peripheral device 21. In the first embodiment, the data stored in the frame store 9 are the bits which make up each packet. Once it is determined that a packet of information is available within the frame store 9, then a packet is retrieved therefrom as illustrated in block 103. In the first embodiment I will assume that the packet consists of 1384 bits.

The packet retrieved from the frame store 9 may fit one of four categories; a First packet, an Even packet, an Odd Packet, or a Last Packet. It is possible for a special case to occur where only one packet is in the input buffer in which case it will be treated as a Last packet (even though it is also a First Packet). Of these four possible cases, only two are possible options at any given time based on the type of packet that preceded it, and of the two possible options one of the options is always the Last Packet option. For example, if the first packet has been retrieved, then that packet could be a first packet or a last packet. If the packet retrieved is the second packet, then the packet is either an even packet or a last packet. If the packet retrieved is the third packet retrieved since the "yes" decision was made in block 102, then the packet is an odd packet or a last packet, etc.

Figure 2A:
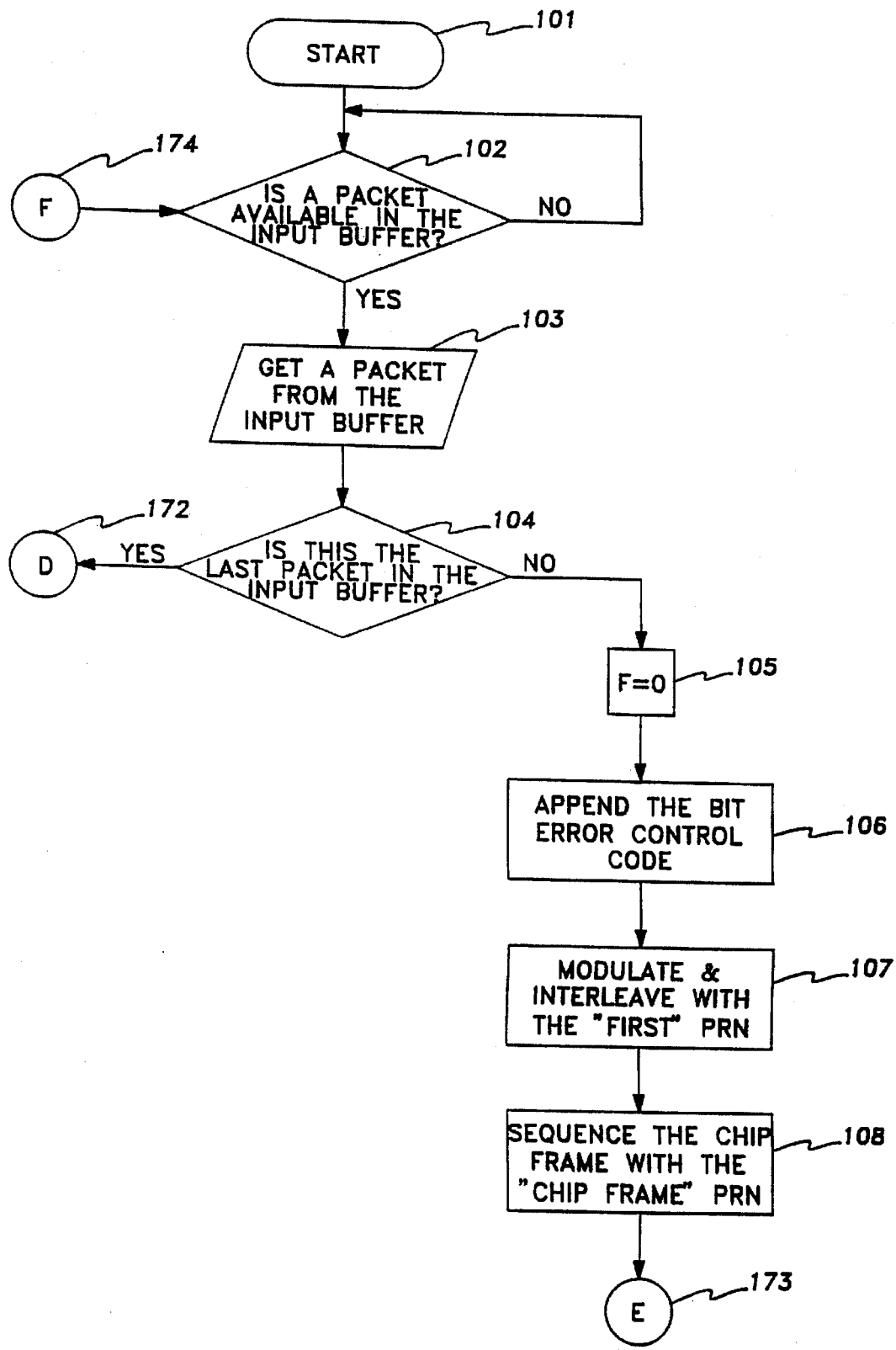
FIGS. 2A—2E are flow charts for the transmission process of the first embodiment of the present invention.

For the present discussion, it is assumed that the first packet is not the last packet in block 104 of FIG. 2A. The next step illustrated in block 105 is to set a counter F to zero for purposes described below. Afterwards, an error control code is added to the packet to produce a frame as indicated by step 106. This bit level error control code will be used by the receive station to determine the validity of the received frame of information. As noted above, many such codes exist in the prior art such as the CRC-16, or CRCCCITT. For illustrative purposes I will assume 16 bits are used by the error control code. The combination of 1384 bits in the packet with 16 error control bits yields a frame of 1400 bits.

In block 107, the spread spectrum modulation and interleaving process is accomplished. This is the process by which the random burst component of the compound error channel is effectively purged from the system by distributing its energy over the frame. The preferred method of spread spectrum modulation and interleaving is conducted as follows for the first chip frame:

1. the first bit of the pRN modulates the first bit of the frame (chip one),
2. the second bit of the pRN modulates the second bit of the frame (chip two),
3. the third bit of the pRN modulates the third bit of the frame (chip three),
4. etc., etc., etc.,
5. the 1,398th bit of the PRN modulates the 1,398th bit of the frame (chip 1,398),
6. the 1,399th bit of the PRN modulates the 1,399th bit of the frame (chip 1,399),
7. the 1,400th bit of the PRN modulates the 1,400th bit of the frame (chip 1,400; the first "chip frame" has now been modulated )

Figure 3:
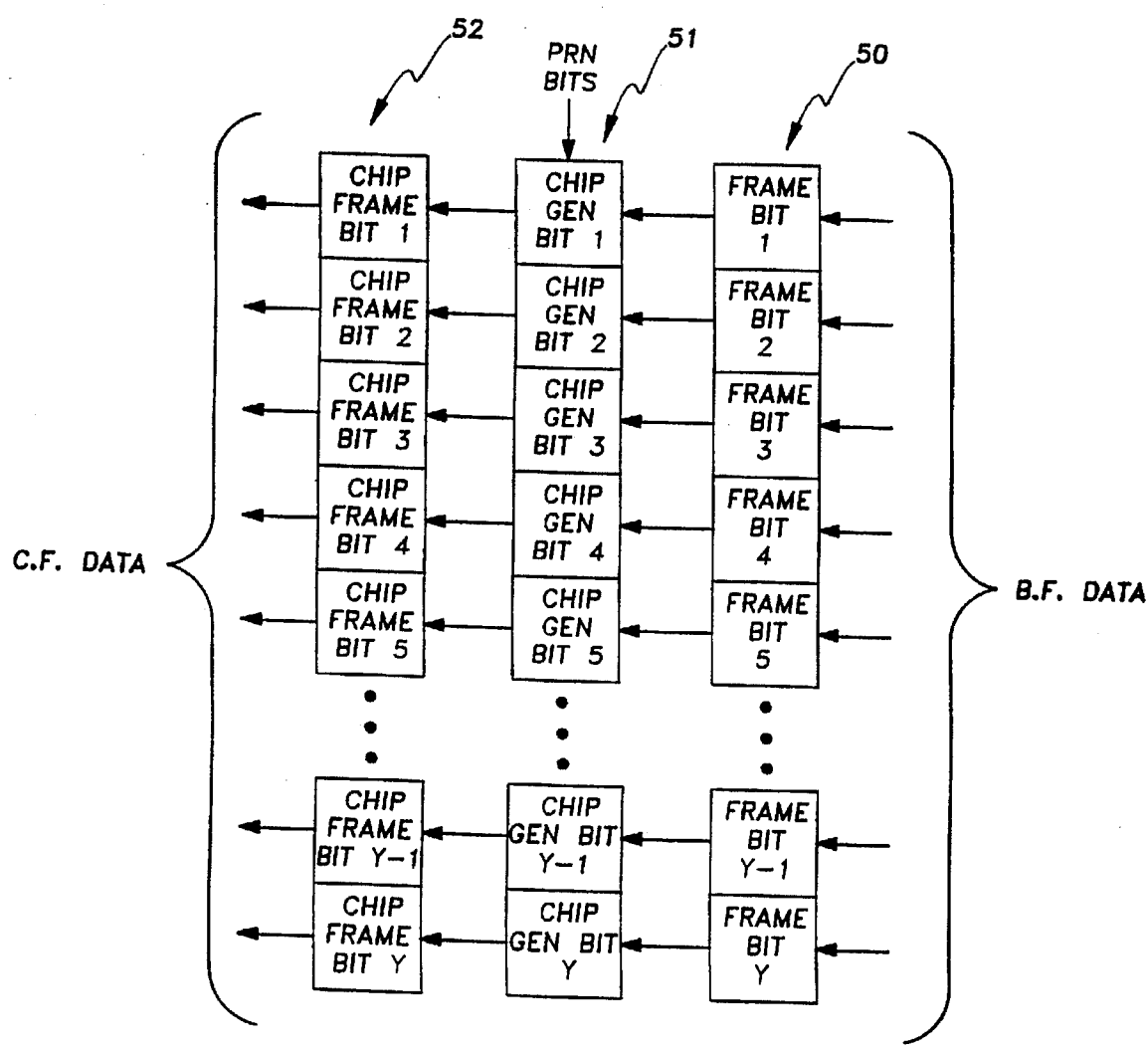
FIG. 3 illustrates how data is modulated in the first embodiment of the present invention.
Figure 4A:
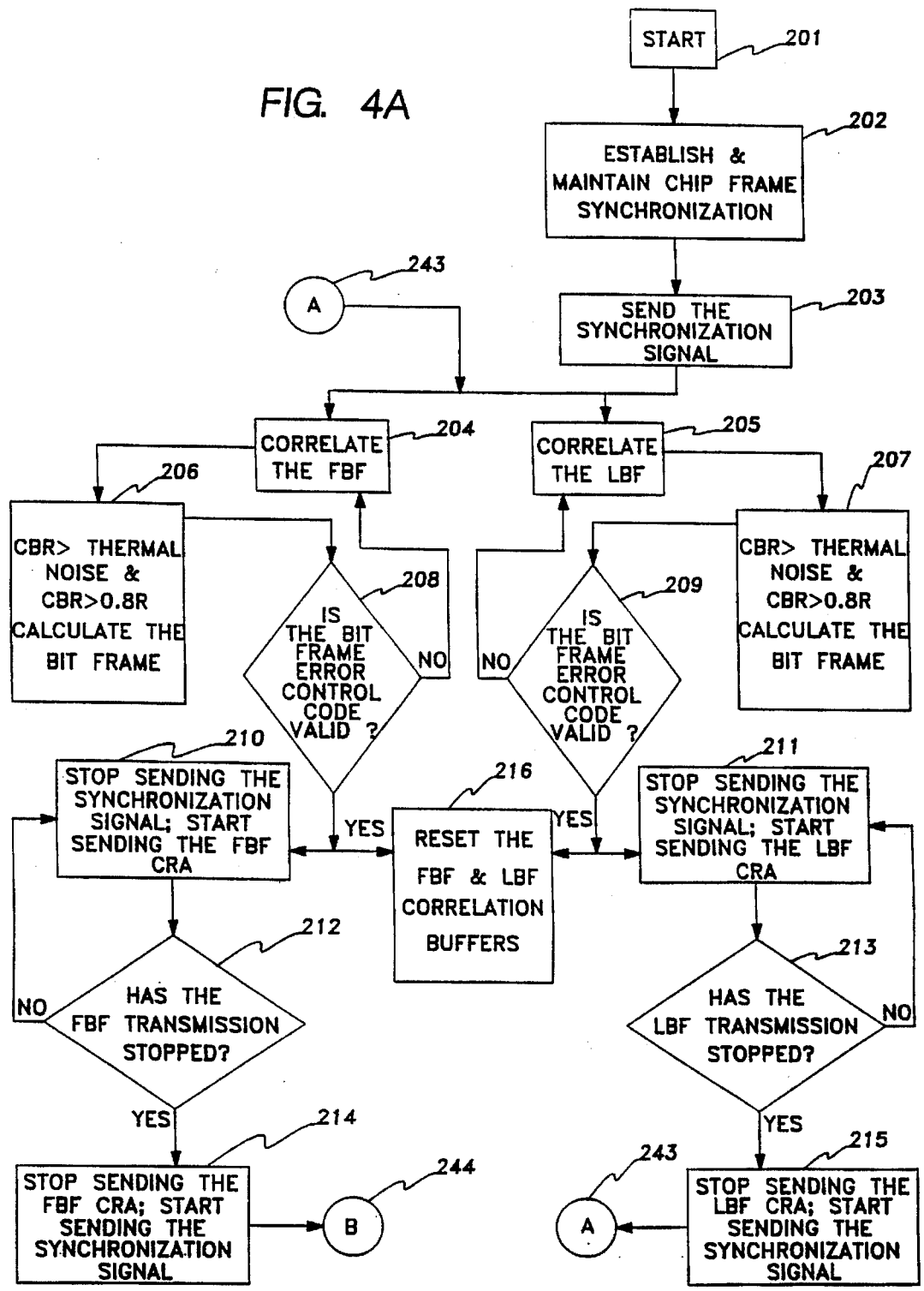
FIGS. 4A—4C are flow charts for the reception process of the first embodiment of the present invention.
Figure 4B:
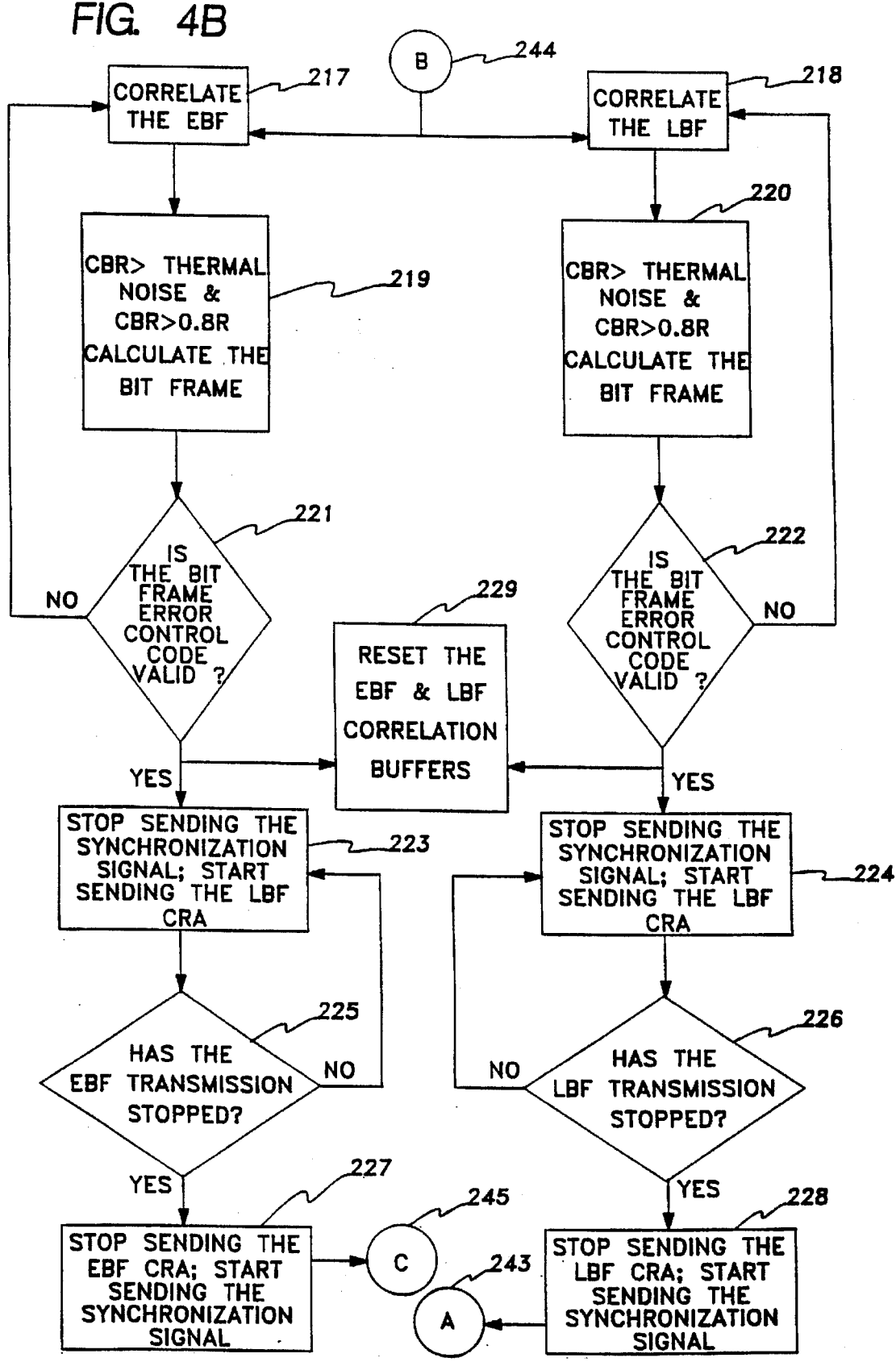
Figure 4C:
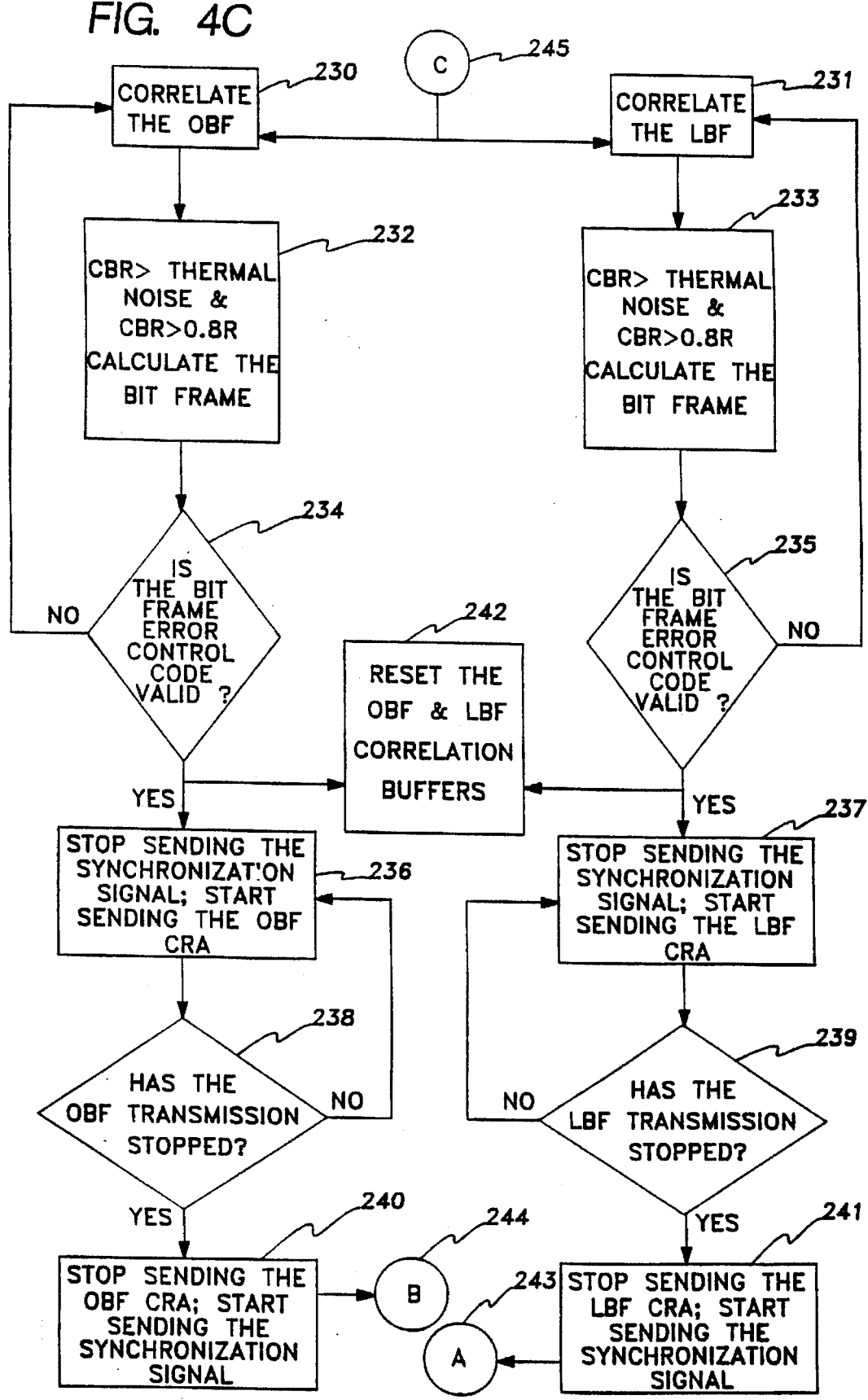

The digital modulation circuit 19 is used to modulate the bit frame to generate the chip frame. FIG. 3 illustrates a block diagram of a portion of the modulation circuit 19. Bit frame data from the BF data line are stored in frame bit locations 1 through Y of memory 50, where Y is equal to 1,400 in the first embodiment. For example, if the BF data line is connected to 16 dedicated ports of the CPU 3 and the digital modulation circuit, then the BF data line would have to be loaded 88 times to completely store all 1,400bits of the frame, wherein during the eighty-eighth time only half of the BF data is left. The pRN data is loaded into chip generators 51 from the data bus 35 in the same manner as the memory circuits 50 are loaded. Both memory circuits 50 and chip generator circuits 51 are accessed by the address bus 33 so that the bit frame data and pRN data are stored at the same time.

The chip generator circuits 51 have storage locations to store the PRN bits and also have exclusive or (XOR) logic circuitry to produce an output upon receiving the ENABLE signal so as to XOR each bit frame with the appropriate chip frame as discussed above, thereby producing the modulated bit frame as the chip frame data. The chip frame data is stored in memory circuits 52. If the CF data line has 16 dedicated ports connecting the digital modulation circuit 19 and the CPU 3, then the address bus will have to access the chip frame eighty-eight times, wherein during the eighty-eighth time only half of the memory circuits 51 are accessed, i.e., only eight bits of information would be transferred to the CPU 3.

In block 108, the order of the chips is scrambled in accordance with a "chip frame" PRN. In this manner the first chip may be located in the eighth chip location or some other location. The objective here is similar to that in step 107 except this step is specifically designed to counter burst noise that is in synchronization with the chip frame structure (that is jamming). This is the process by which the cyclic synchronized burst component of the compound error channel is effectively purged from the system by distributing its energy over the frame. For example, if the synchronized burst component tends to occur in the eighth chip frame component, then for the first frame the first chip may be lost since it was changed to the eighth chip location. In a subsequent chip frame the eighth chip location would be occupied by another chip representing a different bit of the frame. Once the first chip frame has been generated then the subsequent chip frames are generated in a similar fashion:

8. the 1,401th bit of the PRN modulates the 1st bit of the frame (chip 1,401; the start of the second chip frame),
9. the 1,402nd bit of the PRN modulates the 2nd bit of the frame (chip 1,402),
10. the 1,403rd bit of the PRN modulates the 3rd bit of the frame (chip 1,403),
11. etc., etc., etc., until the frame has been modulated to (the exact number to be a design determination) ten times the expected "chip-to-bit" ratio,
12. the 1,400,000th bit of the PRN modulates the 1,400th bit of the frame (chip 1,400,000; for this example the expected chip-to-bit ratio is 100 and each bit would be modulated by 1,000chips).

A method of visualizing this would be to think of it as a Time Division Multiplexed channel with 1400 assigned time slots. Each time slot would contain one chip representing the bit frame after it has been modulated. This is done 1000 times. After step 108has been completed and 1000 chip frames have been modulated and stored in the output buffer 13, the transmitter control circuit 15 begins to transmit the first chip frame (see block/28 of FIG. 2C), and then the CPU 3 waits to receive the first CRA signal from the receiver (see block 129). In steps 132 and 133, the number of chip frames transmitted are counted and, if they exceed 1000 for the first frame, a malfunction has occurred in the system. A system error is indicated to the operator if this occurs (see block/34). The receiver control system 2, to be described later, would be able to demodulate the chip frames representing the first frame before the one-thousandth chip frame is transmitted unless a hardware failure occurs.

While the transmission process represented in blocks 128,129, 132, and 133 is being performed by the transmit control circuitry 15, the CPU 3 is retrieving the next packet to be transmitted (see block 118). In block 119, the next step is to determine whether this packet is the last packet. If not, then the second packet is to be transmitted. The counter E is set to zero in block 121.

The steps performed in blocks 123, 125, and 127 perform the same function on the second frame or any subsequent even frame as the steps which were performed on the first frame in blocks 106, 107, and 108, respectively. If the second packet, or any subsequent even packet, happens to be the last packet to be transmitted, the steps in blocks 120, 122, 124, and 126 are performed which are identical to the steps performed in blocks 121, 123,125, and 127 for an even packet. After the next packet to be transmitted is modified to a bit frame as discussed above and that bit frame is modulated to be a series of chip frames as discussed above, then the CPU 3 waits for the reception for the first CRA signal (see block 129).

Figure 5A:
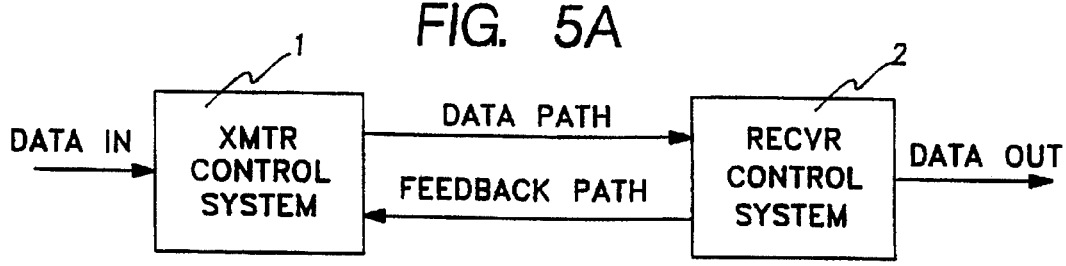
FIGS. 5A—5C are block diagrams of the various system configurations for the various embodiments of the present invention.

Once the receiver control system 2 successfully demodulates the chip frames being transmitted by the transmitter control system 1 along the data path of the communications channel, the system 2 transmits the first CRA along the feedback path of the communications channel (see FIG. 5A). Once the first CRA has been received as determined in block 129 of FIG. 2C, it is determined whether or not the packet just modulated by the CPU 3 as discussed above while the first chip frame was being transmitted is the last packet. If not, then the process goes on to the steps in FIG. 2D. Note that steps 118 through 127 are a parallel process performed simultaneously with steps 128, 129, 132, and 133.

Figure 2B:
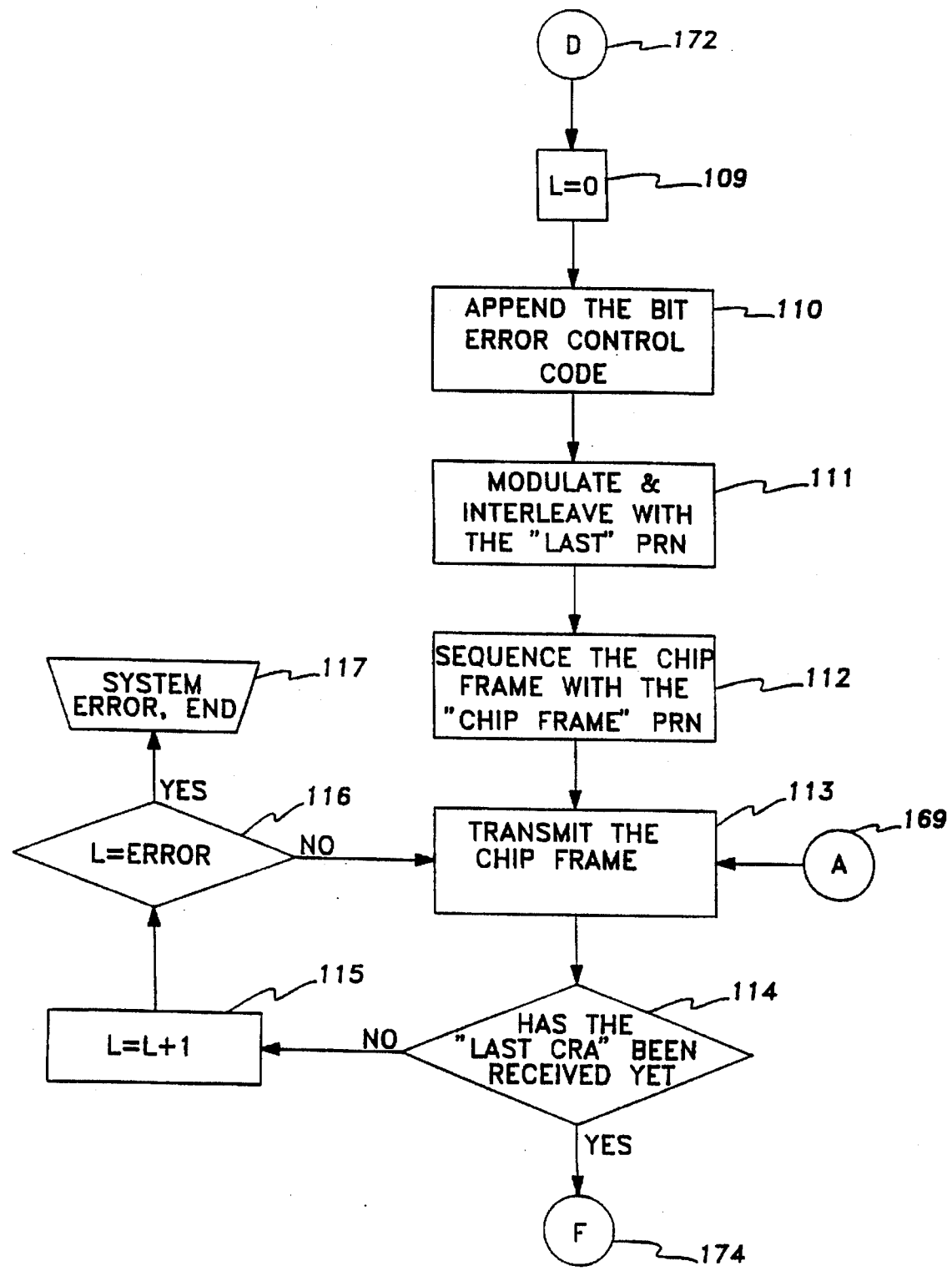
Figure 2C:
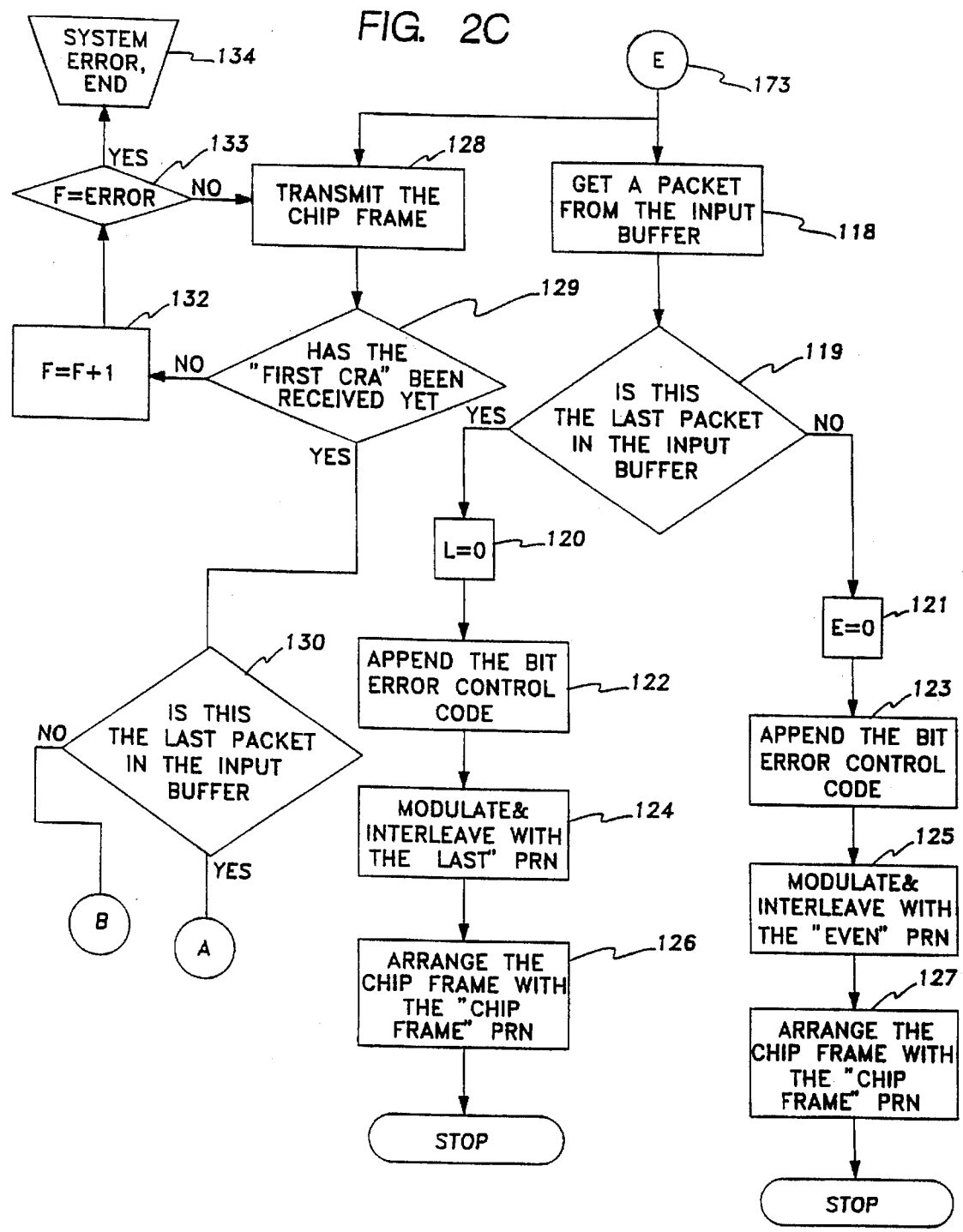
Figure 2D:
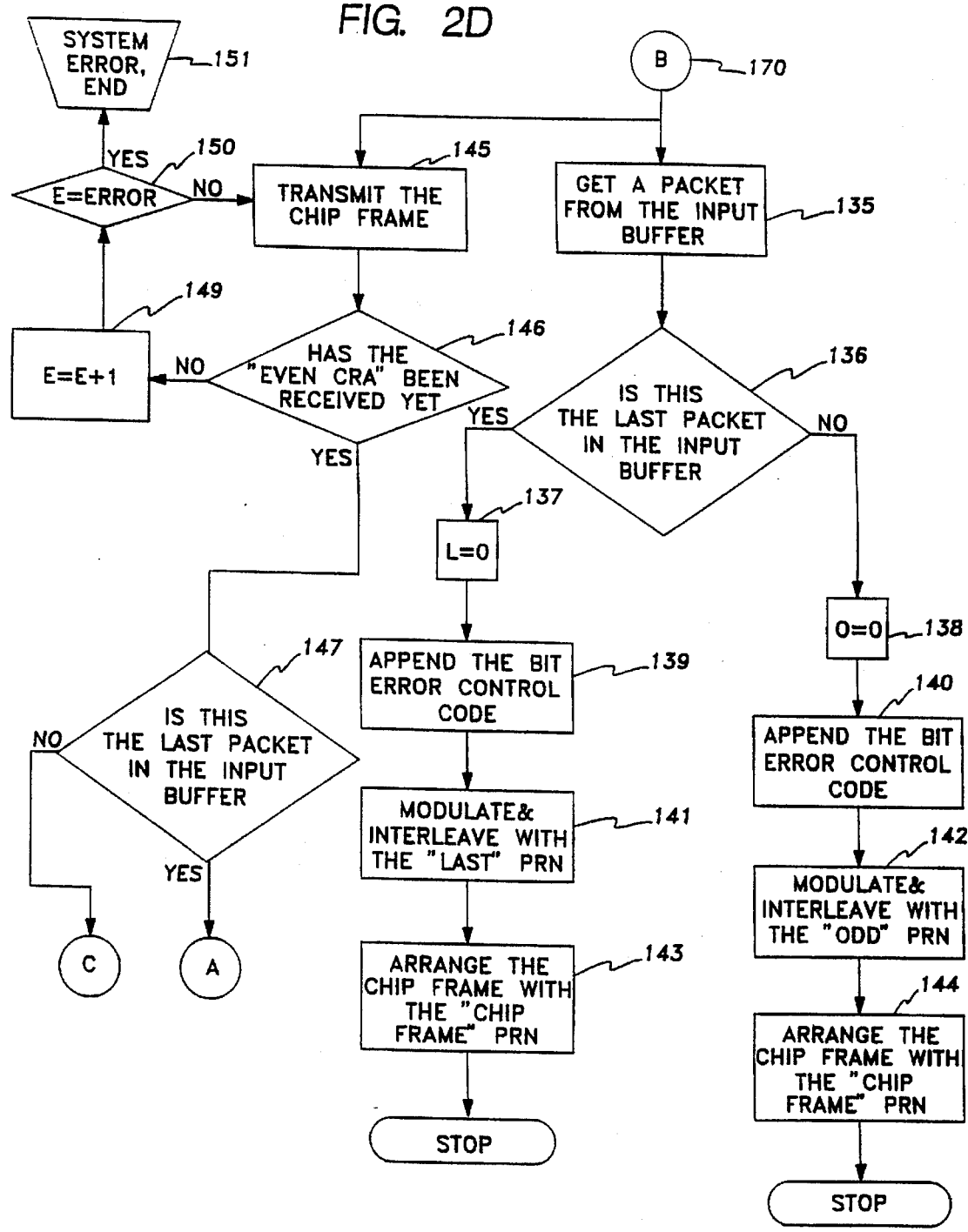

FIG. 2D is identical to FIG. 2C except that the packet modulated in the steps of blocks 140–144 is an odd packet, such as the third packet after the yes decision of block 102 in FIG. 2A. Also, in step 146 the transmitter control system is waiting for an even CRA since the current chip frames being transmitted represent the bit frame of the second packet or some other even packet retrieved from the flame store 9 since the last yes decision of block 102.

Figure 2E:
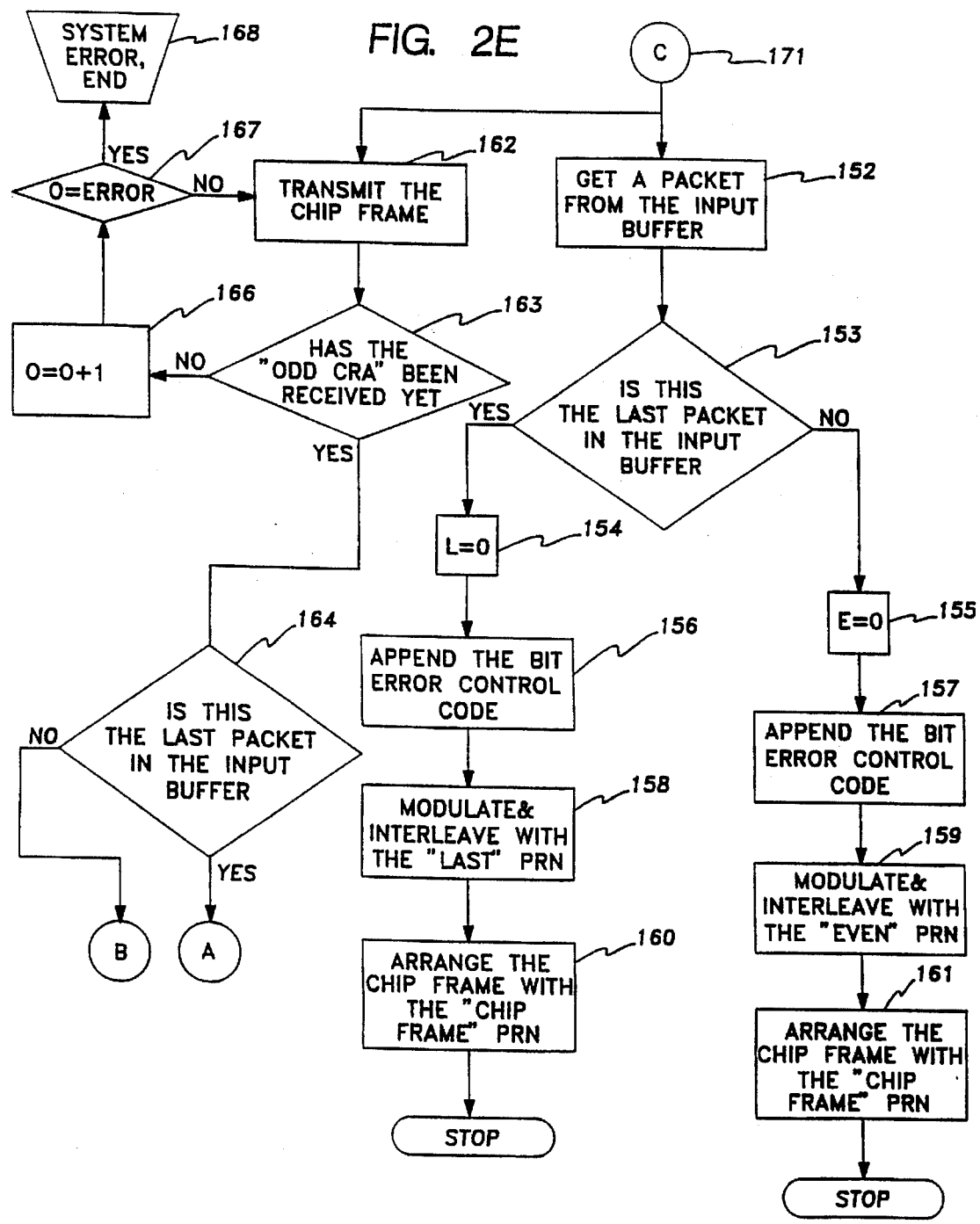

After the even CRA is received, the next step is to determine whether or not the previous packet modulated in the parallel process of FIG. 2E, e.g., blocks 152, 153, etc., was the last packet to be retrieved in the flame store 9. If not, the process goes back to the procedures of FIG. 2D. The processes of FIGS. 2D and 2E are performed until a last packet is retrieved. Note that any packet which is not even, not the first packet, and not the last packet, is considered odd although it may be the thirteenth packet or some other prime number packet.

Once the last packet has been reached as determined in either steps 130, 147, or 164, then the process proceeds to block 113 of FIG. 2B. Blocks 113, 114, 115, and 116 perform the same steps as blocks 128, 129, 132, and 133 did for the first packet transmitted. Note that blocks 109 through 112 are performed only if the first packet is also the last packet to be transmitted. Once the last CRA is received as determined in block 114, the process returns to step 102 to wait for the next available packet.

The Reception process

The reception process consists of some preliminary steps required for synchronization that are in continuous operation (see blocks 201, 202, and 203). The step represented in block 204 correlates the first bit frame (FBF). This process is simply inverting the actions performed by the transmitter. The synchronization process gives the exact time to commence the process, and the pseudo random structures to rearrange the chip frames back to the bit frame order is known, and the exact duration of the chip frame is provided by the synchronization process so the process of associating the chips for a given bit is clear, and the pseudo random sequence used to modulate the bits is a known factor.

Figure 1B:
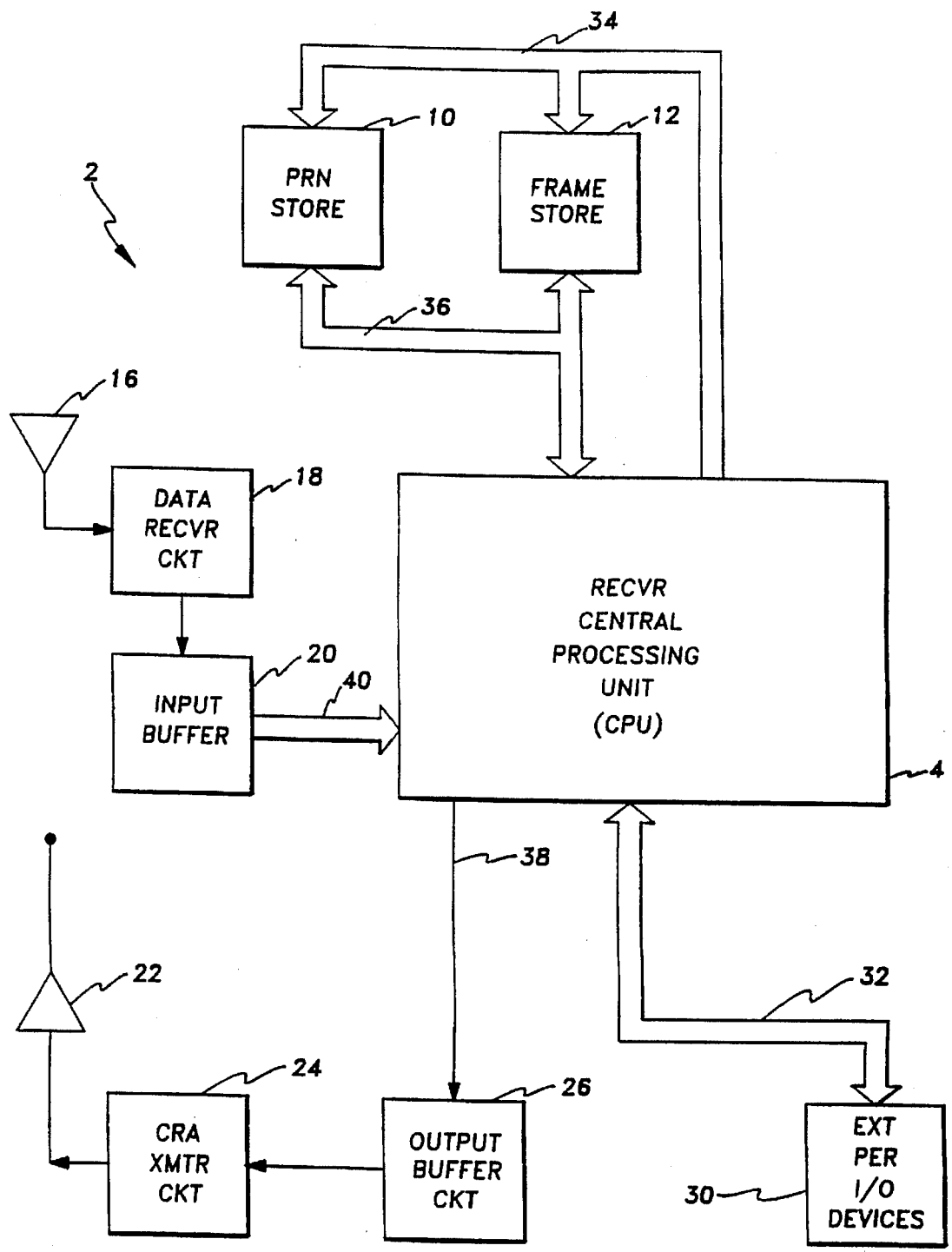

The receiver control system 2 is shown in FIG. 1B. The antenna 16 receives the transmitted data from the data path. The data signal is detected by the data receiver circuit 18 and the received chip data is input to the input buffer 20. The data line 40 transfers data from the input buffer 20 to the CPU 4 of the receiver. pRN store 10 stores the same pRNs which are identical to the PRNs stored in the transmitter controller system 1. In this manner the location of each chip representing a particular bit frame location can be determined as well as the particular PRN bit which modulated that particular bit of the frame. Since the XOR technique was used to modulate the bits of the frame, then if the bit of the PRN agrees with the received chip, then the demodulated bit would be a zero; otherwise, the modulated bit was a one. With synchronization achieved, the receiver knows exactly which PRN modulated which bit of the frame, and is therefore able to modulate each chip to reconstruct the bit frame as each chip frame is received. However, it is to be noted that some of the chip frames are going to be corrupted by noise so as to be improperly demodulated. After enough of the chip frames are received, eventually a majority of the chips will indicate the proper bit modulated, while a minority of the chips were chips which were improperly demodulated.

The step performed in block 206 establishes some basic threshold requirements to exceed before an attempt to generate the bit frame is made. The first requirement is that the current chip to bit ratio (CBR) at the receiver for this bit frame be greater than the chip to bit ratio required to overcome the known thermal noise for the communications channel. Reliable communications can not occur below this value. Any "valid" bit frames below this value are a result of small sample size statistical odds and are likely to be a false "valid" indication.

The second requirement is that the CBR must be greater than. 80% of the equivalent value associated with the synchronization signal (0.8R). For example, if 80% of the chips of the synchronization signal sent by the transmitter are received correctly, then at least 64% of the chips received for each bit of the frame must agree that chip is a particular binary digit. After each chip frame is received, and the preliminary conditions are met, a chip frame is calculated.

At step 208 the bit frame error control code is evaluated to determine frame validity. If the frame is not valid, another chip frame is added to the correlation by cycling back through steps 204 & 206. If the bit frame is validated the correlation buffers are reset in preparation for the next bit frame (step 116), and the acknowledgment process is started (step 210).

The actions required in steps 210, 212, and 214 are clear, but the method of performing step 212 does require clarification. At this point in the process the receiver "knows" what the transmitter is sending in both structure and content. Given this fact the chip stream can be compared to one generated by the receiver to detect when the transition to the next bit frame has occurred. The reason why separate First, Last, Even & Odd codes are used is to ensure that the transitions will be identified. It is possible that if a series of packets are being transmitted, and a burst of noise occurred such that the receiving station never recognized the transitions to the next frame and continues sending the CRA, the continuous CRA could be used for the wrong packet by the transmitter.

The Time/Distance Factors

The time/distance factors, those being the distance between the transmitter and receiver, the chip transmission rate, the nominal chip to bit ratio, and the number of bits in the frame need to be chosen carefully for optimum performance.

The method of obtaining a high energy efficiency is by the careful selection of the nominal chip-to-bit ratio (usually greater than 99 to achieve a nominal throughput efficiency of 99% or better), frame size (greater than three times the nominal chip-to-bit ratio plus two "processing" times), and the physical distance separating station "A" from station "B" over the channel. The requirement is that station "B" must determine that a "valid" packet of data has been received and station "A" must "know" this fact in less time than is required for station "A" to transmit one chip frame.

For example, if I assume that station B will validate the proper reception of a frame of information after receiving 100 chip frames, the following sequence of events and time intervals illustrates the proper time/distance relationships.

1. Station "A" starts sending chip frame 101.

2. Station "A" is separated from station "B" by 400 chips (a chip represents a unit of distance if one considers the wave propagation speed in the channel to be a constant and the chip rate to be a constant; if the desired bit rate is 10,000 bits per second then for a nominal chip-to-bit ratio of 100 the chip rate will be 1,000,000 chips per second; if the channel wave propagation speed is $2.5 \times 10^8$ meters per second then channel wave propagation speed divided by chip rate is distance per chip or [$2.5 \times 10^8$ meters per second] divided by [$1 \times 10^6$ chips per second] is 250 meters per chip, or 100 kilometers for 400 chips).

3. When station "A" starts sending chip 401 of chip frame 101, station "B" will have received the last chip in chip frame 100.

4. Assume that station "B" takes the time associated with the transmission of 100 chips (processing time one) to determine the bit frame is correct and start sending the CRA (station "A" is now at chip 500 of chip frame 101).

5. It takes 400 chips of time for the leading edge of the CRA to reach station "A" (station "A" is now at chip 900 of chip frame 101).

6. As long as there are fewer than 16 units of information (a binary word of four digits) contained in the CRA, an average of 400 chips or less will be required to properly interpret the CRA (station "A" is now at chip 1300 of chip frame 101).

7. Station "A" has 100 chips of time to prepare for the transmission of the next bit frame when the next chip frame starts its transmission cycle.

Alternate Embodiments

Figure 5B:
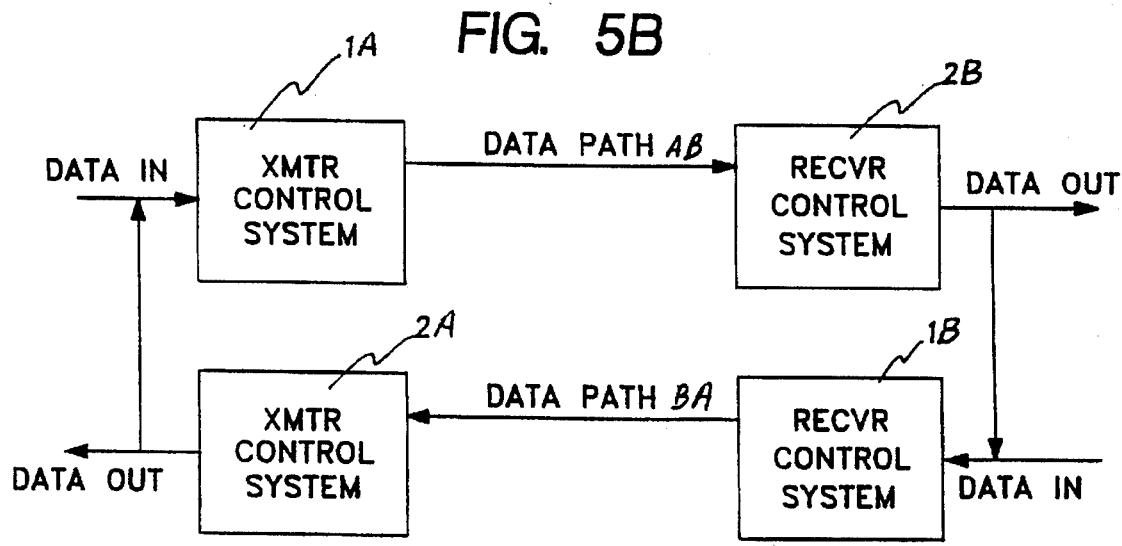

In the first embodiment of FIG. 5A, a feedback path is used for the CRA signal while the data path is used to transmit the chip frames as well as a synchronization signal as discussed above. However, in a second embodiment as shown in FIG. 5B, the feedback path of the communications channel can be omitted. The second embodiment is a full duplex system in which a transmitter control system 1A and a receiver control system 2A are located at a site A, while receiver control system 2B and transmitter control system 1B are located at a different site B. The transmitter control systems 1A and 1B have the same circuit diagram as transmitter control system 1 as illustrated in FIG. 1A.

The transmitter control system 1A transmits the chip frames and a synchronization signal along the data path AB. The synchronization signal also contains the CRA signal which will be explained in more detail below. The receiver control system 2B receives the chips in the same manner as the receiver controls system 2 does. The only difference is that the receiver 2B also receives the CRA signal and must decode it. This is not a problem since, as discussed above, there are only two alternative CRA signals which the receiver looks for at any one time, dependent on the previous frame received.

For example, if the receiver has not received any chip frame, e.g. is just beginning the receiving process, then the receiver is either looking for a first CRA signal to be transmitted along with the synchronization signal or a last CRA signal to be transmitted along with the synchronization signal. If only the synchronization signal is received by the receiver control system 2B, then the receiver control system 2A has not yet decoded the chip frame being presently transmitted by the transmitter control system 1B. If the receiver control system 2A had decoded the chip frame being transmitted by the transmitter control system 1B, then the receiver control system 2A would indicate this to the transmitter control system 1A via an external peripheral output device 30 connected to one of the external peripheral input devices 21 of the transmitter control system 1A. Once the receiver control system 2A has indicated to the transmitter control system 1A that the chip frame being received by it has been correctly demodulated, the transmitter control system 1A transmits the proper CRA signal along the data path AB along with the synchronization signal and the chip frame being transmitted by the transmitter control system 1A. The receiver control system 2B would then indicate to the transmitter control system 1B that the receiver control system 2A has decoded the present bit frame. The transmitter control system then stops transmitting the chip frames of that bit frame in the same manner as disclosed with the first embodiment. The transmitter control system 1B starts transmitting at this point the next series of chip frames representing the next bit frame to be transmitted.

Once receiver control system 2B properly demodulates the bit frame being transmitted by the transmitter control system 1A, then the receiver control system indicates this to the transmitter control system 1B, which in turn indicates this to the receiver control system 2A, which in turn informs the transmitter control system 1A. This is accomplished in the same manner that the receiver control system 2A informed the transmitter control system 1B described above. In this manner, in the second embodiment of the present invention, separate feedback paths are not required.

Figure 5C:
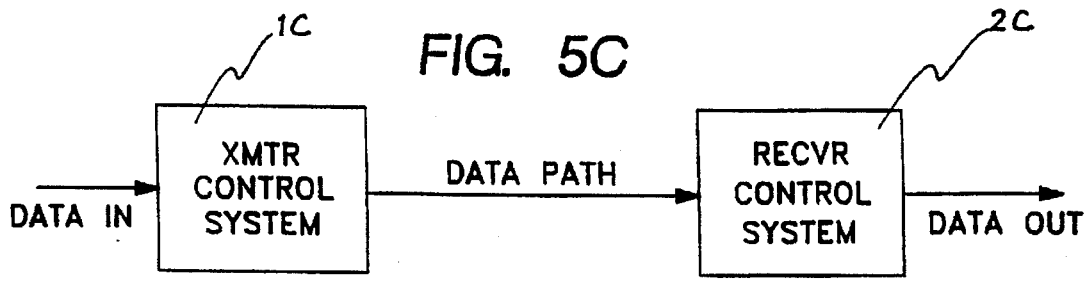

In a third embodiment, as illustrated in FIG. 5C, no feedback path is required because there is no feedback between the transmitter control system 1C and the receiver control system 2C. The transmitter control system 1C has the same circuit configuration as the transmitter control system 1 of the first embodiment. The receiver control system 2C has the same circuitry configuration as receiver control system 2 of the first embodiment. The transmitter control system 1C takes the data input to it and modulates it to create the interleaved chip frames as discussed above (e.g., see the discussion of block 107 of FIG. 2A). Also, if desired, the positioning of the chip frame locations may be rearranged as discussed above (e.g., see the discussion of block 108 of FIG. 2A). The receiver control system 2C demodulates the data on the data path in the same manner as discussed above in conjunction with the first embodiment; however, no CRA is sent.

The data input to the transmitter control system 1C could be packets of information discussed above, or it could be chip frames which are not interleaved, i.e. all chips in one contiguous group represent one bit of the frame. In this case the transmitter control system 1 would simply store the entire chip frame and transmit it in an interleaved fashion as discussed above so as to transform a compound error communications path to a gaussian noise channel by spreading any burst noise which may occur in a contiguous stream of chips among many modulated bit frames since each contiguous chip represents a different bit frame.

The present invention is not limited to the embodiments described above, but encompasses any and all embodiments within the scope of the following claims.

I claim:

1. A method of rearranging chips of a spread spectrum modulated bit frame for the transmission of chip frames, including the step of retrieving multiple groups of chips from the spread spectrum modulated bit frame to form chip frames, each chip frame containing at least one chip from each bit of the spread spectrum modulated bit frame, each chip frame representing a fraction of information from each bit of the bit frame which was spread spectrum modulated, each chip frame thereof representing a fractional part of information contained within the bit frame.

2. A method of rearranging the chips of a spread spectrum modulated bit frame for the transmission of chip frames as claimed in claim 1, further comprising the step of establishing a random order for each chip location within each successive chip frame so as to provide an improved performance against impulsive noise that appeared in synchronization with the transmission of chips.

\* \* \* \* \*